June 2, 1936.                J. T. CATLETT                2,042,504
                            ELECTRODE HOLDER
                           Filed Sept. 6, 1935
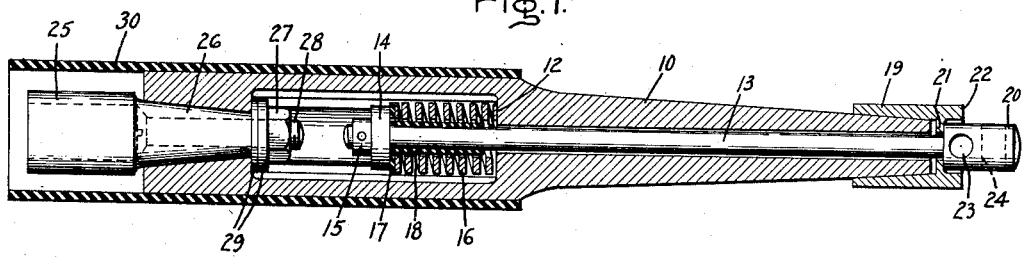
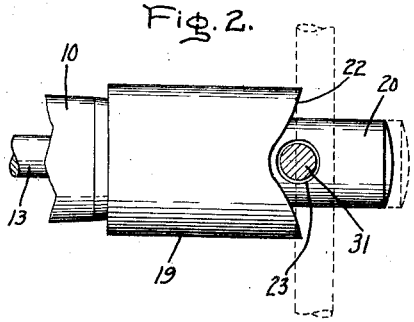
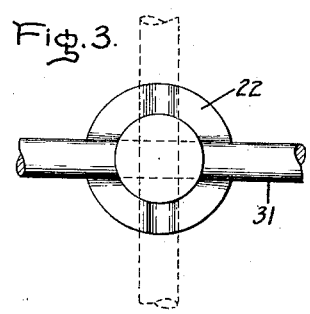
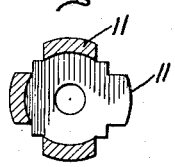
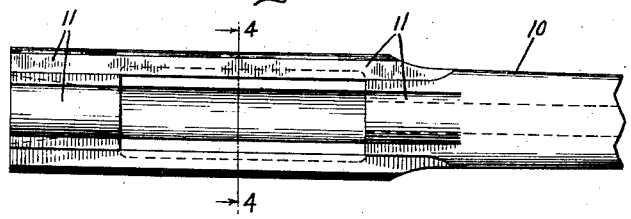
Inventor:
James T. Catlett,
by Harry E. Dunham
His Attorney.

Patented June 2, 1936

2,042,504

UNITED STATES PATENT OFFICE 2,042,504

ELECTRODE HOLDER

James T. Catlett, Scotia, N. Y., assignor to General Electric Company, a corporation of New York Application September 6, 1935, Serial No. 39,417

10 Claims. (Cl. 219—8)

My invention relates to electric arc welding apparatus and more particularly to those tools known as electrode holders. Such tools are employed by arc welding operators for supplying welding current to an arc welding electrode supported therein and for manipulating said electrode during the welding operation.

It is an object of my invention to provide an electrode holder of improved and simplified construction.

It is a further object of my invention to provide an electrode holder comprising two members which are biased relatively to one another to a position in which for one rotational adjustment of said members an opening for an electrode in one member is completely unobstructed by a cam on the other member and for another rotational adjustment of said members an electrode inserted in said opening is held against said cam by the biasing means.

Further objects of my invention will become apparent from the following description taken in connection with the accompanying drawing in which Fig. 1 is a longitudinal sectional view illustrating the relative arrangement of parts of an electrode holder embodying my invention, Figs. 2 and 3 are side and front views of the clamping mechanism in which the electrode is supported, Fig. 4 is a side view illustrating the construction of the handle supporting rear end portion of the electrode holder, and Fig. 5 is a sectional view along lines 4—4 of Fig. 4.

The electrode holder illustrated in the drawing comprises a tubular frame 10 having, as shown in Figs. 4 and 5, a rear end portion enlarged by spaced longitudinal ribs 11 which extend to a front end portion of reduced size. The bore in the front end portion of this frame is of smaller size than the bore in the rear end portion, and an abrupt shoulder 12 is formed at the junction of these bores. A rod 13 rotatably supported in the smaller bore in the front end portion of frame 10 has one end portion extending beyond the front end of the frame 10 and another end portion extending into the larger bore within the frame as illustrated in the drawing. The inner end of the rod 13 is provided with a detachable collar 14 which is secured by a detachable fastening 15 to the end of the rod. A compression spring 16 surrounding the inner end of the rod 13 is located between the collar 14 and the shoulder 12 which forms a spring seat therefor intermediate the ends of the frame 10. This spring is electrically insulated from the collar 14 and from the inner end of the rod 13 by a washer 17 and a sleeve 18. The length of the sleeve 18 should be less than the length of the spring 16 so as not to obstruct a limited forward movement of rod 13 in frame 10. By thus insulating the spring from rod 13, the flow of current through the spring by way of the rod is effectively prevented. This protects the spring from damage due to the heating effect of current flowing therethrough. The spring and its supports constitute a biasing means for holding the rod 13 in a predetermined position relative to the frame 10.

The front end of the frame 10 is provided with a cylindrical cam and the front end portion of the rod 13, which projects from the frame, is provided with an opening. The arrangement is such that the biasing means acting on the rod and frame position these members relative to one another so that for one rotational adjustment of the frame and rod, the opening in the rod is completely unobstructed by the cam and, for another rotational adjustment of the frame and rod, an electrode inserted in the opening is held against the cam by the biasing means.

In the particular arrangement illustrated, the cam forms a part of a sleeve 19 detachably supported on the front end portion of the frame 10. The outer projecting end of the rod 13 is enlarged to form a head 20 which is biased by the action of spring 16 against an internal collar 21 within sleeve 19. Inner and outer openings 23 and 24, spaced from one another and the end of rod 13, are provided in the enlarged end portion 20 of rod 13. The inner opening 23 co-operates with the cam 22 in the manner above described and the outer opening 24 is provided for rotating the rod relatively to the frame through the agency of an electrode inserted therein when the unconsumed electrode fragment in opening 23 is not suitable for this purpose.

A terminal 25 having a tapered shank 26 is clamped in the rear end portion of the frame 10 by means of a nut and bolt 27 and 28. Washers 29, one of which may be a spring or lock washer, are provided to insure a tight connection between the terminal and the frame 10. The conductor by means of which welding current is supplied to the electrode holder, is secured in the receptacle of the terminal by suitable means such as soldering, brazing, or the like.

A tube of fibrous material 30 supported on the ribs 11 on the rear end portion of the holder constitutes a handle for the electrode holder. This tube surrounds and is spaced from the terminal 25 and by reason of its support on ribs 11 forms ventilating passageways extending along the rear end portion of the holder. As shown in Figs. 4 and 5, one of the ribs 11 is cut away to permit the assembly of the holder which requires the placing and connecting of parts within the larger bore of the frame of the holder.

The illustrated arrangement of parts constituting an electrode holder embodying my invention will become apparent from a consideration of its operation. In the arrangement illustrated, the cam 22 is a cylindrical cam having one pair of diametrically opposed depressions of greater depth than another another pair of diametrically opposed depressions angularly displaced 90° relatively to said first mentioned pair of depressions. The rod 13 is biased in the frame 10 to a location in which the opening 23 may be rotated to a position wherein it is unobstructed by the depressions of greater depth in said cam. With the parts in this position, as shown in Figs. 2 and 3, an electrode 31 may be freely inserted in the opening 23 and by turning the rod 13 relatively to the frame 10 through the agency of the electrode 31 inserted in opening 23, this electrode may be moved to the position indicated in dotted lines wherein it is seated in the depressions of lesser depth in the cam 22. In the transition from the loading position to the clamping position the electrode travels over the cam surface and the rubbing action between the electrode and the cam surface effectively removes any insulating materials on the electrode and bares the same to provide an effective electrical contact between the electrode and the metal of the cam through which the welding current supplied to the frame of the holder is supplied to the electrode.

When the electrode has been consumed so only a fragment remains clamped in the holder this fragment may be discharged or removed from the holder by inserting a new electrode in the outer opening 24 located in the head 20 of the rod 13 and by turning rod 13 relative to frame 10 through the agency of the new electrode inserted in the outer opening 24, the inner opening 23 may again be located opposite the depressions of greater depth in the cam 22 from which position the unconsumed fragment will drop from the holder since it is no longer clamped between the frame 10 and the rod 13. Any rod shaped article may serve as a handle when inserted in the outer opening 24 and thus serve to impart rotation to the rod 13 relative to the frame 10 of the electrode holder. It is of course apparent that any convenient means may be provided for rotating the rod 13 relatively to the frame 10 of the electrode holder. The arrangement illustrated is just one of many convenient means for accomplishing this result.

In the arrangement illustrated the cam has been formed as part of sleeve 10 detachably supported on the front end portion of frame 10. It is, of course, apparent that the cam may be made an integral part of the front end of the frame 10. The particular arrangement illustrated and described has been resorted to in order to permit the replacement of a worn cam by a new cam and the sleeve construction illustrated permits this operation to be readily performed.

The materials of which the electrode holder are formed may vary greatly. In the particular electrode holder illustrated, the frame 10 has been made of aluminum and the rod 13 of steel. The sleeve 10 may be made of copper, a copper alloy or steel. The handle 30, sleeve 18, and washer 17 are made of fiber.

It is of course apparent that many modifications may be made without departing from the principle of my invention. For example, a tension spring may be used in place of a compression spring for imparting the desired bias between the rod 13 and frame 10. It is also apparent that biasing means other than a spring means may be employed. The manner of attaching the current conductor to the electrode may be otherwise than that illustrated although the particular arrangement illustrated is of particular utility in that the cable end is inserted in the end of the handle in a convenient manner that does not destroy the balance of the holder and the ease with which it may be manipulated by the welding operator. The method of supporting the handle on the frame of the electrode holder also permits the free circulation of cooling air over the terminal connection and the spring inserted within the holder. This circulation of air prevents an accumulation of heat within the handle portion of the tool. This prevents destruction of the spring or similar biasing means within the holder and also adds materially to the personal comfort of an operator using the electrode holder. A shield supported on the handle or on the frame immediately in front of the handle may be provided to protect the operator's hand from the heat of the arc, as well as from spattered weld metal and sparks produced during the welding operation.

While I have shown a particular embodiment of my invention, it is to be understood that modified arrangements may be provided without departing from the spirit and scope of my invention.

What I claim as new and desire to secure by Letters Patent of the United States is:

1. An electrode holder comprising a frame having a cam on its front end portion, a rod rotatably supported in said frame and having an end portion in which there is an opening for an electrode, and means for biasing said rod relatively to said frame to a position in which for one rotational adjustment of said frame and rod the opening in said rod is completely unobstructed by said cam and for another rotational adjustment of said frame and rod an electrode inserted in said opening is held against said cam by said biasing means.

2. An electrode holder comprising a tubular frame having a cylindrical cam on its front end portion, a rod rotatably supported in said frame and having an end portion in which there is an opening for an electrode, and means for biasing said rod relatively to said frame to a position in which for one rotational adjustment of said frame and rod the opening in said rod is completely unobstructed by said cam and for another rotational adjustment of said frame and rod an electrode inserted in said opening is held against said cam by said biasing means.

3. An electrode holder comprising a tubular frame having a cam surface on its front end portion, a rod supported in said frame and having an end portion in which there is an opening for an electrode, means for biasing said rod relatively to said frame to a position in which for one rotational adjustment of said frame and rod the opening in said rod is completely unobstructed by said cam and for another rotational adjustment of said frame and rod an electrode inserted in said opening is held against said cam by said biasing means, a terminal connected to the rear end portion of said frame and a handle surrounding said terminal and supported on the rear end portion of said frame.

4. An electrode holder comprising a tubular frame having a rear end portion enlarged by spaced longitudinal ribs which extend to a front end portion of reduced size, a rod rotatably supported in said frame and having an end portion in which there is an opening for an electrode, a sleeve detachably supported on the front end of said frame and having a cam surface on its front end portion, means for biasing said rod relatively to said frame to a position in which for one rotational adjustment of said frame and rod the opening in said rod is completely unobstructed by the cam of said sleeve and for another rotational adjustment of said frame and rod an electrode inserted in said opening is held against said cam by said biasing means, means for supplying welding current to said frame and a handle supported on said ribs, the spaces between said ribs and said handle forming ventilating passageways extending along the rear end portion of said holder.

5. An electrode holder comprising a tubular frame the front end portion of which terminates in a cylindrical cam having one pair of diametrically opposed depressions of greater depth than another pair of diametrically opposed depressions angularly displaced relatively to said first mentioned pair of depressions, a rod rotatably supported in said frame and having an end portion in which there is an opening for an electrode, and means for biasing said rod relatively to said frame to a position in which for one rotational adjustment of said frame and rod the opening in said rod is completely unobstructed by the cam depressions of greater depth and for another rotational adjustment of said cam and rod an electrode inserted in said opening is held in the cam depressions of lesser depth by said biasing means.

6. An electrode holder comprising a tubular frame having a bore in its front portion of smaller size than the bore in its rear portion and an abrupt shoulder at the junction of said bores, a rod rotatably supported in said smaller bore and having an enlarged front end portion which may be seated against the front end of said frame and a rear end portion extending into the larger bore in said frame, a collar on the rear end of said rod, a spring between said collar and the shoulder within said frame, a sleeve of insulating material supported on the exterior surface of the rear end portion of said frame, and means for supplying welding current to said frame, the front end portion of said frame terminating in a cylindrical cam having one pair of diametrically opposed depressions of greater depth than another pair of diametrically opposed depressions angularly displaced relatively to said first mentioned pair of depressions and the projecting enlarged front end portion of said rod having an opening for an electrode which is unobstructed by the depressions of greater depth in said cam when said enlarged end portion is seated against the end of said frame by the action of said spring on said rod and said frame and said rod and frame have a predetermined rotational adjustment relative to one another.

7. An electrode holder comprising a tubular frame having an internal spring seat intermediate its ends and an enlarged rear end portion connected by spaced longitudinal ribs with a front end portion of reduced size, a rod rotatably supported in the front end portion of said frame and having its inner end extending beyond said spring seat and its outer end extending beyond the front end portion of said frame, a collar on the inner end of said rod, means including a spring surrounding the inner end of said rod and located between said collar and said internal spring seat for biasing said rod to a predetermined position relatively to said frame, a terminal connected to the enlarged end portion of said frame, and a sleeve of insulating material supported on the spaced longitudinal ribs of said frame and surrounding and spaced from said terminal to form ventilating passageways extending along the rear end portion of said holder, the front end portion of said frame terminating in a cylindrical cam having one pair of diametrically opposed depressions of greater depth than another pair of diametrically opposed depressions angularly displaced relatively to said first mentioned pair of depressions and said rod having spaced from its outer end an opening therein which by rotating said rod relative to said frame is movable into a position which is unobstructed by the depressions of greater depth in said cam when said rod is in said predetermined position toward which it is biased by said spring, the arrangement being such that an electrode extending through said opening is rotatably movable over said cam into said depressions of lesser depth in which it is clamped between the front end portion of said frame and the outer end portion of said rod.

8. An electrode holder comprising a tubular frame having an internal spring seat intermediate its ends, a rod rotatably supported in said frame and having an enlarged outer end portion in which there is an opening spaced from the front end of said rod and an inner end portion extending beyond said spring seat, a sleeve detachably supported on the front end of said frame and having an internal collar against which the enlarged end portion of said rod may be seated, a collar on the inner end of said rod, a spring surrounding the inner end of said rod and located between said collar and said internal spring seat, means for insulating said spring from said collar and the inner end of said rod about which it is located, a terminal connected to the rear end of said frame, and a sleeve of insulating material surrounding the inner end of said frame in said terminal, the front portion of said sleeve supported on the front end of said frame terminating in a cylindrical cam having one pair of diametrically opposed depressions of greater depth than another pair of diametrically opposed depressions angularly displaced relatively to said first mentioned pair of depressions and the opening in the enlarged front end portion of said rod being movable by rotating said rod relatively to said frame into a position which is unobstructed by the depressions of greater depth in said cam when the enlarged end portion of said rod is seated against said shoulder in said sleeve by the action of said spring on the inner end of said rod the arrangement being such that an electrode extending through said opening is rotatably movable over said cam into said depressions of lesser depth in which it is clamped between said sleeve and the outer end portion of said rod.

9. An electrode holder comprising a tubular frame having an internal spring seat intermediate its ends and a rear end portion enlarged by spaced longitudinal ribs which extend to a front end portion of reduced size, a rod rotatably supported in the front end portion of said frame and having its inner end extending beyond said spring seat and its outer end enlarged and extending beyond the front end portion of said frame, a sleeve detachably supported on the front end of said frame and having an internal collar against which the enlarged end portion of said rod may be seated, a collar on the inner end of said rod, a spring surrounding the inner end of said rod and located between said collar and said internal spring seat, means for insulating said spring from said collar and the inner end of said rod about which it is located, a terminal connected to the rear end of said frame and a sleeve of insulating material supported on the spaced longitudinal ribs of said frame and surrounding and spaced from said terminal to form ventilating passageways extending along the rear end portion of said holder, the front portion of said sleeve supported on the front end of said frame terminating in a cylindrical cam having one pair of diametrically opposed depressions of greater depth than another pair of diametrically opposed depressions angularly displaced relatively to said first mentioned pair of depressions and the opening in the enlarged front end portion of said rod being movable by rotating said rod relatively to said frame into a position which is unobstructed by the depressions of greater depth in said cam when the enlarged end portion of said rod is seated against said shoulder in said sleeve by the action of said spring on the inner end of said rod, the arrangement being such that an electrode extending through said opening is rotatably movable over said cam into said depressions of lesser depth in which it is clamped between said sleeve and the outer end portion of said rod.

10. An electrode holder comprising a tubular frame having an internal spring seat intermediate its ends and a rear end portion enlarged by spaced longitudinal ribs which extend to a front end portion of reduced size, a rod rotatably supported in the front end portion of said frame and having its inner end extending beyond said spring seat and its outer end extending beyond the front end portion of said frame, a collar on the inner end of said rod, means including a spring surrounding the inner end of said rod and located between said collar and said internal spring seat for biasing said rod to a predetermined position relatively to said frame, a terminal connected to the end of the rear end portion of said frame, and a sleeve of insulating material supported on the spaced longitudinal ribs of said frame and surrounding and spaced from said terminal to form ventilating passageways extending along the rear end portion of said holder, the front end portion of said frame terminating in a cylindrical cam having one pair of diametrically opposed depressions of greater depth than another pair of diametrically opposed depressions angularly displaced relatively to said first mentioned pair of depressions and said rod having spaced from one another and from its outer end, an inner and an outer opening, the inner opening being movable by rotating said rod relative to said frame into a position which is unobstructed by the depressions of greater depth in said cam when said rod is in said predetermined position toward which it is biased by said spring, the arrangement being such that an electrode extending through said inner opening is rotatably movable over said cam into said depressions of lesser depth in which it is clamped between the front end portion of said frame and the outer end portion of said rod and that the unconsumed fragment of an electrode thus clamped is discharged from the electrode holder by moving it opposite said depressions of greater depth in said cam by rotating said rod relative to said frame through the agency of an electrode inserted in said outer opening.

JAMES T. CATLETT.